(12) United States Patent
Al Hosani et al.

(10) Patent No.: US 12,258,973 B2
(45) Date of Patent: Mar. 25, 2025

(54) APPARATUS FOR OPTIMAL LOADSHARING BETWEEN PARALLEL GAS COMPRESSORS

(71) Applicant: Khalifa University of Science and Technology, Abu Dhabi (AE)

(72) Inventors: Khalifa Al Hosani, Abu Dhabi (AE); Igor Boiko, Abu Dhabi (AE); Mohammad Luai Hammadih, Abu Dhabi (AE); Ayman Al Zawaideh, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 380 days.

(21) Appl. No.: 17/793,695

(22) PCT Filed: Feb. 2, 2021

(86) PCT No.: PCT/IB2021/050836
§ 371 (c)(1),
(2) Date: Jul. 19, 2022

(87) PCT Pub. No.: WO2021/161133
PCT Pub. Date: Aug. 19, 2021

(65) Prior Publication Data
US 2023/0061958 A1 Mar. 2, 2023

Related U.S. Application Data

(60) Provisional application No. 62/972,216, filed on Feb. 10, 2020.

(51) Int. Cl.
*F04D 27/02* (2006.01)
*F04B 49/06* (2006.01)
(Continued)

(52) U.S. Cl.
CPC .......... *F04D 27/0269* (2013.01); *F04B 49/06* (2013.01); *F04B 49/20* (2013.01);
(Continued)

(58) Field of Classification Search
None
See application file for complete search history.

(56) References Cited

U.S. PATENT DOCUMENTS 4,747,755 A * 5/1988 Ohtsuki ................ F04C 28/125
417/310
5,347,467 A * 9/1994 Staroselsky ......... F04D 27/0269
700/282
(Continued)

FOREIGN PATENT DOCUMENTS

| JP | 2019138200 A | 8/2019 |
| KR | 100481016 B1 | 4/2005 |
| WO | 9922138 A1 | 5/1999 |

OTHER PUBLICATIONS

International Search Report and Written Opinion Received received for PCT/IB2021/050836, mailed on May 7, 2021.

*Primary Examiner* — Hua Lu
(74) *Attorney, Agent, or Firm* — Billion & Armitage

(57) ABSTRACT

A gas compressing system including a plurality of n compressors connected in parallel. Each compressor has a suction line connected to a common suction manifold and a discharge line connected to a common discharge manifold configured to deliver compressed gas to a downstream load. The system also includes a process controller configured to control an average speed of the compressors based upon a discharge pressure in the common discharge manifold or a discharge flow through the common discharge manifold. The system further includes an adaptive load sharing optimizing controller configured to determine the speed of each
(Continued)

compressor in the plurality of n compressors. A method of controlling a gas compressing system is also provided.

20 Claims, 3 Drawing Sheets

(51) Int. Cl.
  *F04B 49/20* (2006.01)
  *F04D 25/06* (2006.01)
  *F04D 25/16* (2006.01)
  *F04D 27/00* (2006.01)

(52) U.S. Cl.
  CPC ............ *F04D 25/06* (2013.01); *F04D 25/16* (2013.01); *F04D 27/004* (2013.01); *F05D 2270/20* (2013.01); *F05D 2270/3011* (2013.01); *F05D 2270/3013* (2013.01); *F05D 2270/3061* (2013.01); *F05D 2270/705* (2013.01)

(56) References Cited

U.S. PATENT DOCUMENTS

| | | | | |
|---|---|---|---|---|
| 6,068,447 | A * | 5/2000 | Foege | F04B 49/225 |
| | | | | 417/12 |
| 8,360,744 | B2 | 1/2013 | Mirsky et al. | |
| 2003/0063981 | A1* | 4/2003 | Saxena | F01D 17/06 |
| | | | | 417/286 |
| 2009/0232663 | A1* | 9/2009 | Mirsky | F25J 1/005 |
| | | | | 415/36 |
| 2011/0115223 | A1* | 5/2011 | Stahlkopf | H02P 9/04 |
| | | | | 290/7 |
| 2012/0297788 | A1* | 11/2012 | Panov | F01D 17/085 |
| | | | | 60/39.24 |
| 2013/0152572 | A1* | 6/2013 | Madderno | F04B 9/1256 |
| | | | | 60/413 |
| 2014/0241906 | A1* | 8/2014 | Jan | F01D 15/08 |
| | | | | 417/53 |
| 2016/0025364 | A1* | 1/2016 | Mills, Jr. | F24F 11/46 |
| | | | | 700/278 |
| 2017/0152856 | A1* | 6/2017 | Grassens | F04D 27/0261 |
| 2017/0335776 | A1* | 11/2017 | Iannuzzi | F02C 3/30 |
| 2018/0307997 | A1* | 10/2018 | Escobedo Hernández | |
| | | | | G01M 15/02 |
| 2018/0372086 | A1* | 12/2018 | Yashiki | F04B 49/10 |

\* cited by examiner

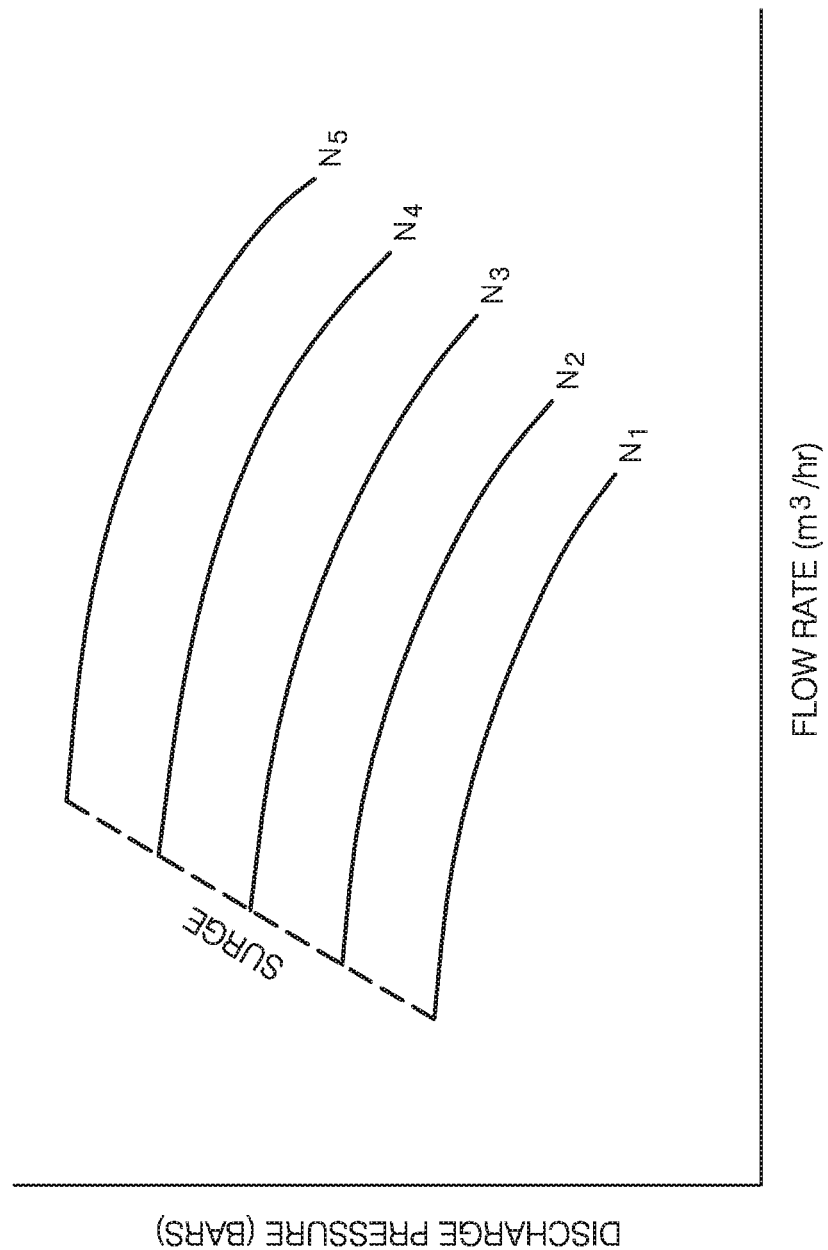

APPARATUS FOR OPTIMAL LOADSHARING BETWEEN PARALLEL GAS COMPRESSORS

CROSS-REFERENCE TO RELATED APPLICATIONS

This application is a National Stage Application of International Patent Application No. PCT/IB2021/0580836 filed Feb. 2, 2021, which claims priority to U.S. Provisional Patent Application 62/972,216 filed on Feb. 10, 2020, the entire disclosure of each of which is hereby incorporated by reference.

FIELD OF INVENTION

The present invention relates to systems and methods for controlling a parallel gas compressing system, specifically to control systems for a load sharing gas compressing system having multiple parallel compressors.

BACKGROUND

Gas compressing systems may use multiple gas compressors connected in a parallel configuration to provide a sufficient volume of gas at a desired pressure. The multiple gas compressors may be controlled to maintain the desired gas volume and pressure delivered by the gas compressing system while also optimizing the efficiency of the gas compressing system. For a compressor system consisting of a few compressors, the conventional control technique would involve a dedicated proportional-integral (PI) or proportional-integral-differential (PID) controller for each compressor, possibly in addition to a master pressure or flow controller which may also use a PI or PID control algorithm.

SUMMARY

The present invention is related to a gas compressing system having multiple compressors connected in parallel. The gas compressing system has a single process controller, an adaptive load sharing optimizing controller, and a plurality of speed demand computation modules, thereby eliminating the need for a load sharing controller for each compressor in the gas compressing system. The feedback control loop and adaptation control loop are decoupled; therefore, better dynamic performance and stability of the pressure and flow control is achieved compared to a gas compressing system having several process controllers. Furthermore, optimal energy efficiency of the compressors is realized.

According to one or more aspects of the present disclosure, a gas compressing system includes a plurality of n compressors connected in a parallel pneumatic circuit. Each compressor in the plurality of n compressors has a suction line in pneumatic communication with a common suction manifold that is configured to receive a gas stream from an upstream source and a discharge line that is in pneumatic communication with a common discharge manifold. The gas compressing system is configured to deliver compressed gas to a downstream load. The gas compressing system also includes a process controller that is configured to control an average speed of the plurality of n compressors based upon an operator set point and at least one parameter selected from a list consisting of a discharge pressure in the common discharge manifold and a discharge flow through the common discharge manifold. The gas compressing system further includes an adaptive load sharing optimizing controller that is configured to control a speed of each compressor in the plurality of n compressors based on suction line pressure and flow and a discharge line pressure in the plurality of n compressors and the average speed determined by the process controller. The gas compressing system additionally includes a plurality of n speed demand computation modules configured to produce a speed demand signal for each compressor in the plurality of n compressors.

In one or more embodiments of the gas compressing system according to the previous paragraph, the plurality of n compressors includes a first compressor driven by a first variable speed drive system and an $n^{th}$ compressor driven by an $n^{th}$ variable speed drive system. The adaptive load sharing optimizing controller is in communication with the first and the $n^{th}$ speed demand computation module, which by means of computation produce the first and the $n^{th}$ speed demand signals supplied to the first and the $n^{th}$ variable speed drive systems. The process controller is configured to calculate an average compressor speed based upon at least one parameter selected from the list consisting of the discharge pressure in the common discharge manifold and the discharge flow through the common discharge manifold. The adaptive load sharing optimizing controller includes a load split parameter module configured to iteratively calculate a compressor load split parameter $\lambda$ transmitted to first and the $n^{th}$ speed demand computation module is configured to calculate a first speed signal and an $n^{th}$ speed signal transmitted to the first variable speed drive system and the $n^{th}$ variable speed drive system respectively based upon the average compressor speed and the compressor load split parameter $\lambda$.

In one or more embodiments of the gas compressing system according to any one of the previous paragraphs, $\lambda_{i,k} = [\lambda_{1,k} \lambda_{2,k} \ldots \lambda_{n-1,k}]^T$ for $i^{th}$ compressor and $k^{th}$ iteration of the compressor load split parameter $\lambda$ (40), where $\Sigma_{i=1}^{n-1} \lambda_{i,k} \leq 1$, and $0 < \lambda_{i,k} < 1$.

In one or more embodiments of the gas compressing system according to any one of the previous paragraphs, $u_1 = \lambda_1 \cdot u_{avg}$, $u_2 = \lambda_2 \cdot u_{avg}$, ..., $u_n = (1 - \lambda_1 - \lambda_2 \ldots - \lambda_{n-1}) \cdot u_{avg}$, such that $\Sigma_{i=1}^{n-1} \lambda_i = 1$ and $0 < \lambda_i < 1$.

In one or more embodiments of the gas compressing system according to any one of the previous paragraphs, the gas compressing system further includes a discharge pressure transducer configured to measure the discharge pressure in the common discharge manifold. The process controller is a proportional-integral controller configured to determine the average compressor speed based on a difference between an operator set point and the discharge pressure.

In one or more embodiments of the gas compressing system according to any one of the previous paragraphs, the process controller determines the average compressor speed according to the following equation: $u_{avg}(t) = K_p e(t) + K_i \int_0^t e(t)dt$, where $K_p$ is a proportional gain parameter, $K_i$ is an integral gain parameter, and $e(t)$ is a difference between the operator set point and the discharge flow.

In one or more embodiments of the gas compressing system according to any one of the previous paragraphs, the adaptive load sharing optimizing controller includes an implied speed computation module configured to determine a first implied speed signal and an $n^{th}$ implied speed signal for $i^{th}$ compressor and $k^{th}$ iteration from the values of $\lambda_{i,k}$, the average compressor speed ($u_{avg}$) a first discharge pressure measured by a first pressure transducer in pneumatic communication with a first discharge line of the first compressor, a first suction flow through a first suction line measured by a first suction flow transducer in pneumatic communication with the first suction line, an $n^{th}$ discharge pressure measured by an $n^{th}$ pressure transducer in pneumatic communication with an $n^{th}$ discharge line of the $n^{th}$ compressor, an $n^{th}$ suction flow through an $n^{th}$ suction line measured by an $n^{th}$ suction flow transducer in pneumatic communication with the $n^{th}$ suction line, and an operator set point.

In one or more embodiments of the gas compressing system according to any one of the previous paragraphs, the first implied speed signal and the $n^{th}$ implied speed signal are determined by solving nonlinear algebraic equations of pressure ratios $P_1=f_1(q_1, u_1)$, $P_2=f_2(q_2, u_2)$, ..., $P_n=f_n(q_n, u_n)$, for $q_1, q_2, \ldots, q_n$ using stored performance characteristics of each compressor in the plurality of n compressors, where $q_1, q_2, \ldots, q_n$ are the first through $n^{th}$ suction flows.

In one or more embodiments of the gas compressing system according to any one of the previous paragraphs, the adaptive load sharing optimizing controller includes a consumed energy computation module configured to determine an energy required each compressor in the plurality of n compressors based upon a current value of $\lambda_{i,k}$, a current first speed signal and a current $n^{th}$ speed signal, the first discharge pressure, the first suction flow, the $n^{th}$ discharge pressure, the $n^{th}$ suction flow, and the operator set point.

In one or more embodiments of the gas compressing system according to any one of the previous paragraphs, a total efficiency Q is calculated using pre-computed compressor efficiency curves g where $Q_1=g_1(q_1, u_1)$, $Q_2=g_2(q_2, u_2)$, ..., $Q_n=g_n(q_n, u_n)$.

In one or more embodiments of the gas compressing system according to any one of the previous paragraphs, the implied speed computation module computes the implied speed signal for each compressor from $k^{th}$ iteration of $\lambda$ denoted as $\lambda_{i,k}$ and supplies the implied speed signal to the consumed energy computation module, which provides the energy required for each compressor for a given implied speed, wherein consumed energy computation module determines if the consumed energy at $k^{th}$ iteration of $\lambda$, denoted as $\lambda_{i,k}$, is decreased compared to the previous iteration, a new $k+1^{th}$ iteration $\lambda_{i,k+1}$ is calculated by the module for $\lambda$ iteration in accordance with the consumed energy at the $k^{th}$ decreasing compared to the $k-1^{th}$ iteration, and no further iterations of $\lambda$ are calculated by the module for $\lambda$ iteration in accordance with the consumed energy at the $k^{th}$ not decreasing compared to the $k-1^{th}$ iteration.

In one or more embodiments of the gas compressing system according to any one of the previous paragraphs, the module for $\lambda$ iteration stops calculating iterations of $\lambda$ in accordance with exceeding a time threshold for calculating an iteration of $\lambda$.

According to one or more aspects of the present disclosure, a method of controlling a gas compressing system having a plurality of n compressors connected in a parallel pneumatic circuit, wherein each compressor in the plurality of n compressors has a suction port in pneumatic communication with a common suction manifold configured to receive a gas stream from an upstream source and a common discharge manifold configured to deliver compressed gas to a downstream load is provided. The method includes controlling a speed of the plurality of n compressors based upon at least one parameter selected from a list consisting of a discharge pressure in the common discharge manifold and a discharge flow through the common discharge manifold. The speed of each compressor is based on suction line pressure and flow and discharge line pressure of each compressor, and an operator set point.

In one or more embodiments of the method according to the previous paragraph, the plurality of n compressors includes a first compressor driven by a first variable speed drive system and an $n^{th}$ compressor driven by an $n^{th}$ variable speed drive system. The method further includes calculating an average compressor speed by using a process controller, based upon at least one parameter selected from the list consisting of the discharge pressure in the common discharge manifold and the discharge flow through the common discharge manifold. The method also includes iteratively calculating a compressor load split parameter $\lambda$ and calculating a first speed signal and an $n^{th}$ speed signal, based on the average compressor speed and the compressor load split parameter $\lambda$. The method additionally includes transmitting the first speed signal and the $n^{th}$ speed signal to the first variable speed drive system and the $n^{th}$ variable speed drive system, respectively.

In one or more embodiments of the method according to any one of the previous paragraphs, the process controller is a proportional-integral controller. The method further includes measuring the discharge pressure in the common discharge manifold and determining the average compressor speed based on a difference between an operator set point and the discharge pressure.

In one or more embodiments of the method according to any one of the previous paragraphs, the process controller is a proportional-integral controller. The method further includes measuring the discharge flow through the common discharge manifold and determining the average compressor speed based on a difference between an operator set point and the discharge flow.

In one or more embodiments of the method according to any one of the previous paragraphs, the method also includes measuring a first discharge pressure in a first discharge line of the first compressor, a first suction flow through a first suction line, an $n^{th}$ discharge pressure in an $n^{th}$ discharge line of the $n^{th}$ compressor, and an $n^{th}$ suction flow through an $n^{th}$ suction line and determining a first implied speed signal and an $n^{th}$ implied speed signal for $i^{th}$ compressor and $k^{th}$ iteration from the values of $\lambda_{i,k}$, the average compressor speed, the first discharge pressure, the first suction flow, the $n^{th}$ discharge pressure, the $n^{th}$ suction flow, and the operator set point. The first implied speed signal and the $n^{th}$ speed signal are determined by solving nonlinear algebraic equations of pressure ratios using stored performance characteristics of each compressor in the plurality of n compressors.

In one or more embodiments of the method according to any one of the previous paragraphs, the method additionally includes determining an energy required each compressor in the plurality of n compressors based upon a current value of $\lambda_{i,k}$, the current first implied speed signal and the current $n^{th}$ implied speed signal, the current first discharge pressure, the first suction flow, the $n^{th}$ discharge pressure, the $n^{th}$ suction flow, and the operator set point.

In one or more embodiments of the method according to any one of the previous paragraphs, the method further includes calculating a total efficiency Q using pre-computed efficiency curves.

In one or more embodiments of the method according to any one of the previous paragraphs, the method also includes determining if energy consumed at a $k^{th}$ iteration of $\lambda$ denoted as $\lambda_{i,k}$ is decreasing compared to the previous iteration, calculating a new $k+1^{th}$ iteration of $\lambda$ denoted as $\lambda_{i,k+1}$ in accordance with the energy consumed at the $k^{th}$ iteration is decreasing compared to the $k-1^{th}$ iteration, not calculating any further iterations of $\lambda$ in accordance with the consumed energy at the $k^{th}$ not decreasing compared to the $k-1^{th}$ iteration, and ceasing calculating iterations of $\lambda$ in accordance with exceeding a time threshold for calculating an iteration of $\lambda$.

BRIEF DESCRIPTION OF THE DRAWINGS

FIG. 3 shows a graph illustrating precomputed discharge pressure vs. flow rate performance characteristics of a compressor at various compressor speeds according to some embodiments.

DETAILED DESCRIPTION

Figure 1:
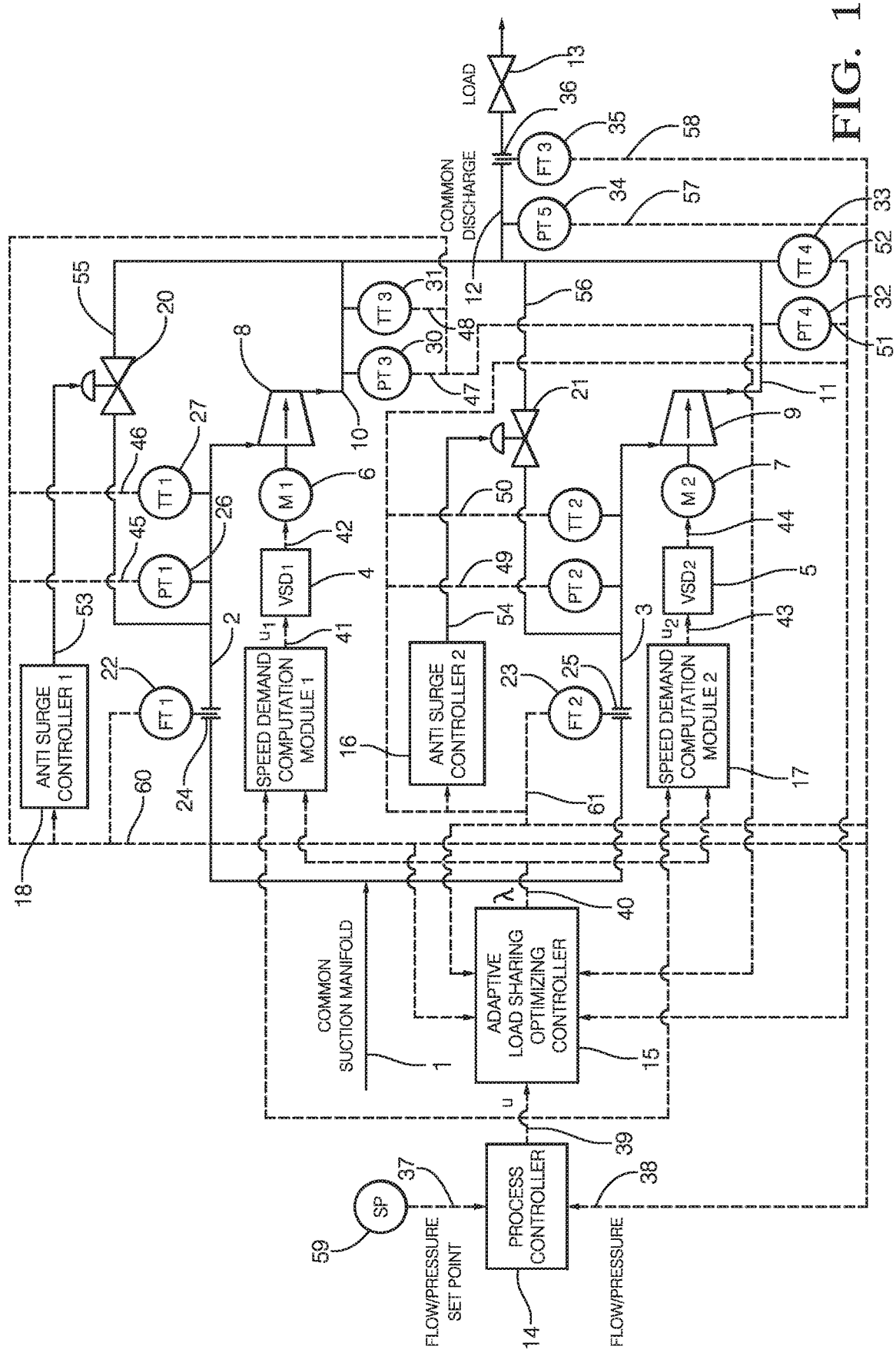
FIG. 1 shows a schematic diagram of a gas compression system with two dynamic gas compressors connected in parallel according to some embodiments.

FIG. 1 shows a schematic diagram of a control system for a gas compression system comprising n dynamic compressors 8, 9 connected in parallel. In the illustrated example, n=2 but n can be any integer greater than 1. The first and second compressors 8,9 are configured to compress a gas entering a common suction manifold 1 and deliver the compressed gas into a common discharge manifold 12 and to a load 13. The first and second compressors 8, 9 are driven by first and second motors 6, 7. The speed of the first and second motors 4,5 and thereby the speed of the first and second compressors 8, 9, can be controlled by first and second variable speed drives 4, 5. Adaptive load sharing optimizing controller 15 controls the speed of the first and second motors 4, 5 via first and second motor speed signals 42, 44. The first and second compressors 8, 9 have first and second suction flow transducers 22, 23 configured to measure the rate of the volume of gas flowing into the first and second compressors 8, 9 through the first and second suction lines 2, 3 from a process upstream to the common suction manifold 1.

A first suction pressure transducer 26, first temperature transducer 27, first discharge pressure transducer 30, and first discharge temperature transducer 31 are provided for measuring a first suction pressure 45 and a first suction temperature 46 in the first suction line 2 and a first discharge pressure 47 and a first discharge temperature 48 respectively in the first discharge line 10 of the first compressor 8. A second suction pressure transducer 28, a second suction temperature transducer 29, a second discharge pressure transducer 32, and a second discharge pressure temperature transducer 33 are provided for measuring suction pressure 49, suction temperature 50 in the second suction line 3 and second discharge pressure 51 and discharge temperature 52 respectively in the second discharge line 11 of the second compressor 9.

The control system consists of a common process controller 14 that is configured to control a discharge flow 58 in the common discharge manifold 12 as measured by a flow transducer 35. The process controller 14 may alternatively/also be configured to control discharge pressure 57 in the common discharge manifold 12 which is measured by a pressure transducer 34. The control system also includes a separate adaptive load sharing optimizing controller 15 that optimizes load-sharing between the first and second compressors 8, 9. The control system further includes first and second anti-surge controllers 18, 19 to provide anti-surge protection for the first and second compressors 8, 9.

The process controller 14 determines a desired compressor speed $u_{avg}$ based on the operator set point 59 and the discharge pressure 57 or the discharge flow 58. The process controller 14 in one embodiment is implemented as a proportional integral (PI) controller, where the controller output $u_{avg}$ is determined according to the following equation: $u_{avg}(t) = K_p e(t) + K_i \int_0^t e(t)dt$, where $K_p$ is a tuning parameter described as the proportional gain constant, $K_i$ is also a tuning parameter described as the integral gain constant, while e(t) is the error variable being the difference between the value of the operator set point 59, which is ether a set discharge flow or a set discharge pressure, and the measured output process variable (either the discharge flow 58 or the discharge pressure 57).

Figure 2:
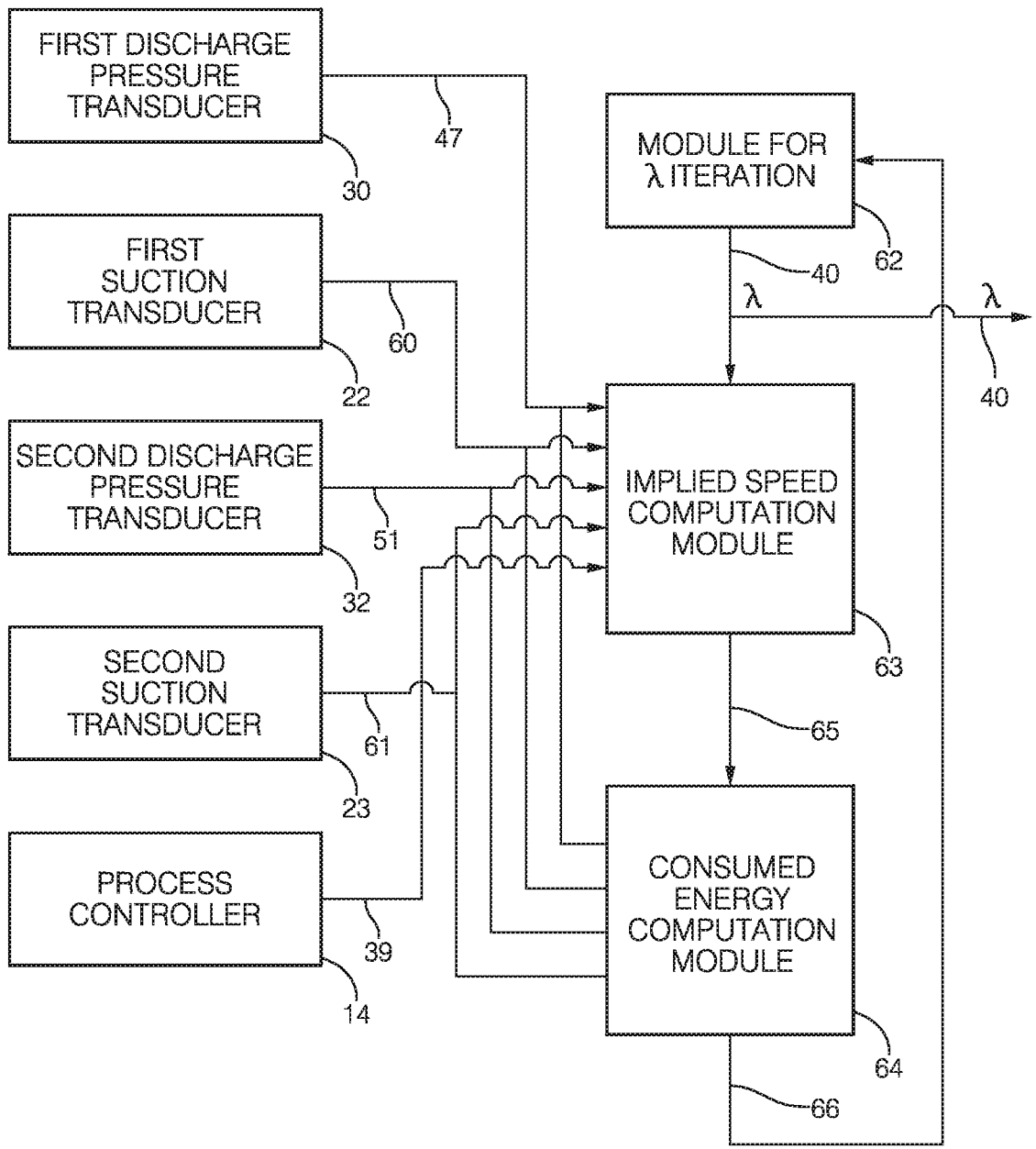
FIG. 2 shows a schematic diagram of an adaptive load sharing optimizing controller of the gas compression system of FIG. 1 according to some embodiments.

As illustrated in FIG. 2, an adaptive load sharing optimizing controller 15 includes a load split parameter module 62 for iteratively calculating the compressor load split parameter λ 40 for n parallel compressors The load split parameter module 62 is an optimization module which uses methods of parametric optimization such as the simplex algorithm to generate the values of the compressor load split parameter λ 40. The load split parameter module 62 is an optimization module which uses available algorithms of parametric optimization. In one embodiment the simplex algorithm is used to generate values of the compressor load split parameter λ. The compressor load split parameter λ 40 for $i^{th}$ compressor and $k^{th}$ iteration is given as $\lambda_{i,k} = [\lambda_{1,k} \lambda_{2,k} \ldots \lambda_{n-1,k}]^T$ where $\Sigma_{i=1}^{n-1} \lambda_{i,k} \leq 1$, and $0 < \lambda_{i,k} < 1$ for i=1, 2, . . . , n−1. In one embodiment, $$\lambda_{i,0} = \frac{0.5}{n}$$

for n compressors where $\lambda_{i,0}$ represents the initial value of $\lambda_{i,k}$ for the compressor load split parameter λ.

The adaptive load sharing optimizing controller 15 also includes an implied speed computation module 63 which computes the desired speeds $u_1, u_2, \ldots, u_n$ for the compressor as follows: $u_1 = \lambda_1 \cdot u_{avg}$, $u_2 = \lambda_2 \cdot u_{avg}$, . . . , $u_n = (1 - \lambda_1 - \lambda_2 - \ldots - \lambda_{n-1}) \cdot u_{avg}$ such that $\Sigma_{i=1}^{n-1} \lambda_{i,k} \leq 1$ and $0 < \lambda_i < 1$. The implied speed is a value varied in the implied speed computation module with the purpose to find an optimal value. Once the optimal value is determined, the compressor load split parameter λ is output from the module. The value of the compressor load split parameter λ is used to produce speed demands for each compressor via the speed demand computation modules 16, 17.

The speed demands of the compressor system are computed by solving nonlinear algebraic equations of pressure ratios $P_1 = f_1(q_1, u_1)$, $P_2 = f_2(q_2, u_2)$, . . . , $P_n = f_n(q_n, u_n)$, for $q_1, q_2, \ldots, q_n$ using pre-computed performance characteristics of each compressor, where $q_1, q_2, \ldots, q_n$ are flows through the first compressor 8, the second compressor 9 . . . , the $n^{th}$ compressor and $u_1, u_2, \ldots, u_n$ are the desired speed of the first compressor 8, the second compressor 9 . . . , the $n^{th}$ compressor.

The adaptive load sharing optimizing controller 15 may further include a consumed energy computation module 64 which is used to produce a signal representative 66 of an energy required for each compressor at current value of $\lambda_{i,k}$, current speed demands 65. Both the implied speed computation module 63 and the consumed energy computation module 64 produce their output signals based on current operating points of the first discharge pressure 47 measured by the first discharge pressure transducer 30, the first suction line flow 60 through the first suction line 2 measured by the first suction flow transducer 22, the second discharge pressure 51 measured by the second discharge pressure transducer 32, the second suction line flow 61 through the second suction line 3 measured by the second suction flow transducer 23, and the operator set point 59. The consumed energy computation module 64 computes a signal representative of the energy required for the first and second compressors 8, 9 at current value of $\lambda_{i,k}$, current speed demand and a current operating point of the first discharge pressure 47 of the first compressor 8, the flow through the first suction line 2 measured by the first suction flow transducer 22, the second discharge pressure 51 measured by the second discharge pressure transducer 32, the second suction line flow 61 through the second suction line 3 measured by the second suction flow transducer 23, and the operator set point 59. Total efficiency is calculated using pre-computed efficiency curves $Q_1=g_1(q_1, u_1)$, $Q_2=g_2(q_2, u_2)$, . . . , $Q_n=g_n(q_n, u_n)$.

Referring now to FIG. 3, performance characteristics curves include multiple curves which represent pre-computed performance of a compressor as a function of discharge pressure, flow rate and speed of the compressor. These curves depict the performance under the standard condition (i.e., a curve indicative of the relationship of the pressure to the flow rate). $N_1$ in FIG. 3 illustrates the situation where the compressor is running at the slowest speed of the pre-computed performance, the speed of the compressor increases as the operating point moves from $N_2$ to $N_3$, to $N_4$, or to $N_5$ the situation where the compressor is running at the fastest speed. The surge line indicates the surge limit of the compressor. These performance characteristic curves are used by the implied speed computation module 63 to compute speed demands in the adaptive load sharing optimizing controller 15.

The process controller 14 also includes first and second anti-surge controllers 18, 19 for the first and second compressors 8, 9, respectively, that are configured to manipulate the set-points for first and second recycle valves 20, 21. A first recirculation line 55 back feeds compressed gas from the first discharge line 10 into the first suction line 2 of the first compressor 8 through the first recycle valve 20 controlled by the first anti-surge controller 18. The second recirculation line 56 feeds the gas into the second suction line 3 of the second compressor 9, which also receives gas from the suction manifold 1. The first and second anti-surge controllers 18, 19 provide first and second recycle valve control signals 53, 54, respectively, to manipulate openings of the first and second recycle valves 20, 21, respectively, by means of actuators and positioners, so that the flow rate through the first or second compressor 8, 9 is increased by means of redirecting some of the gas flow from the first or second discharge lines 10, 11 through the first or second recycle valves 20, 21 to the first or second suction line 2, 3 and increasing the flow rate through the first or second compressor 8, 9.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

REFERENCE NUMBERS

1 Common Suction Manifold
2 First Suction Line
3 Second Suction Line
4 First Variable Speed Drive
5 Second Variable Speed Drive
6 First Motor
7 Second Motor
8 First Compressor
9 Second Compressor
10 First Discharge Line
11 Second Discharge Line
12 Common Discharge Manifold
13 Load
14 Process Controller
15 Adaptive Load Sharing Optimizing Controller
16 First Speed Demand Compensation Module
17 Second Speed Demand Compensation Module
18 First Anti-Surge Controller
19 Second Anti-Surge Controller
20 First Recycle Valve
21 Second Recycle Valve
22 First Suction Flow Transducer
23 Second Suction Flow Transducer
24 First Suction Flow Transducer Orifice Plate
25 Second Suction Flow Transducer Orifice Plate
26 First Suction Pressure Transducer
27 First Suction Temperature Transducer
28 Second Suction Pressure Transducer
29 Second Suction Temperature Transducer
30 First Discharge Pressure Transducer
31 First Discharge Temperature Transducer
32 Second Discharge Pressure Transducer
33 Second Discharge Temperature Transducer
34 Discharge Pressure Transducer
35 Discharge Flow Transducer
36 Discharge Flow Transducer Orifice Plate
37 Flow Set Point/Pressure Set Point
38 Discharge Flow/Discharge Pressure
39 Process Control Signal
40 Compressor Load Split Parameter $\lambda$
41 First Drive Speed Signal
42 First Motor Speed Signal
43 Second Drive Speed Signal
44 Second Motor Speed Signal
45 First Suction Pressure
46 First Suction Temperature
47 First Discharge Pressure
48 First Discharge Temperature
49 Second Suction Pressure
50 Second Suction Temperature
51 Second Discharge Pressure
52 Second Discharge Temperature
53 First Recycle Valve Control Signal
54 Second Recycle Valve Control Signal
55 First Recirculation Line
56 Second Recirculation Line
57 Discharge Pressure
58 Discharge Flow
59 Operator Set Point
60 First Suction Flow
61 Second Suction Flow
62 Compressor Load Split Parameter $\lambda$ Calculation Module
63 Implied Speed Computation Module
64 Consumed Energy Computation Module
65 Current Speed Demand Signal
66 Required Energy Signal
u Speed Demand Signal
$u_1$ First Speed Demand Signal
$u_2$ Second Speed Demand Signal

What is claimed is:

1. A gas compressing system, comprising:
a plurality of n compressors connected in a parallel pneumatic circuit, each compressor in the plurality of n compressors each having a suction line in pneumatic communication with a common suction manifold configured to receive a gas stream from an upstream source and each having a discharge line in pneumatic communication with a common discharge manifold configured to deliver compressed gas to a downstream load;
a plurality of n suction flow transducers configured to measure a suction line flow rate of gas flowing through each suction line into the plurality of n compressors and further configured to produce signals representing said flow rates;
a plurality of n suction pressure transducers configured to measure a suction line pressure of gas flowing through each suction line and produce signals representing said pressures;
a plurality of n discharge pressure transducers configured to measure a discharge line pressure of gas flowing through each discharge line from the plurality of n compressors and produce signals representing said pressures;
a discharge flow transducer configured to measure a discharge line flow rate of gas flowing through the common discharge manifold and produce a signal representing said flow rate;
a discharge manifold pressure transducer configured to measure a discharge pressure of gas in the common discharge manifold and produce a signal representing said pressure;
a process controller having an input signal being either representative of the discharge line flow rate signal or representative of the common discharge manifold pressure signal, and generating an output signal representing an aggregate load demand for all n compressors based upon an operator set point;
an adaptive load sharing optimizing controller configured to generate n−1 signals representing load split parameters $\lambda_i$ for the plurality of n compressors based on suction line pressure signal and suction line flow rate signal in each suction line and discharge line pressure signal in each discharge line in the plurality of n compressors and the aggregate load demand signal provided by the process controller; and
a plurality of n speed demand computation modules configured to compute a speed demand signal for each compressor in the plurality of n compressors, based on the signal representing load split parameters $\lambda_i$, and send these speed demand signals to each compressor in the plurality of n compressors, to control the speed of each compressor in the plurality of n compressors.

2. The gas compressing system according to claim 1, wherein the plurality of n compressors include n compressors driven n variable speed drive systems, so that each $i^{th}$ compressor is driven by an $i^{th}$ variable speed drive system, wherein the adaptive load sharing optimizing controller is in communication with n speed demand computation modules, which compute n speed demand signals supplied to said n variable speed drive systems, wherein the process controller is a programmable logic controller configured to calculate an aggregate load demand signal ($u_{avg}$) based upon at least one parameter selected from a list consisting of the discharge pressure signal in the common discharge manifold and the discharge flow rate signal through the common discharge manifold, and wherein the adaptive load sharing optimizing controller is a programmable logic controller and includes a load split parameter module configured to iteratively calculate a compressor load split parameter signals $\lambda=[\lambda_1\ \lambda_2\ \ldots\ \lambda_{n-1}]^T$ transmitted to n speed demand computation modules configured to calculate an $i^{th}$ speed demand signal ($u_i$), i=1 . . . n, transmitted to said $i^{th}$ variable speed drive system based upon the aggregate load demand signal ($u_{avg}$) and the compressor load split parameter signal $\lambda_i$, for each compressor in the plurality of n compressors.

3. The gas compressing system according to claim 2, wherein said load split parameter signal $\lambda_{j,k}=[\lambda_{1,k}\ \lambda_{2,k}\ \ldots\ \lambda_{n-1,k}]^T$ for $i^{th}$ compressor and $k^{th}$ iteration of the compressor load split parameter $\lambda$, is computed to satisfy the constraint $\Sigma_{i=1}^{n-1}\lambda_{i,k}=1$, and $0<\lambda_{i,k}<1$.

4. The gas compressing system according to claim 2, wherein n speed demand computation modules are software modules in one or several programmable logic controllers, and said speed demand signals in each of the n speed demand computation modules is computed as $u_1=\lambda_1\cdot u_{avg}$, $u_2=\lambda_2\cdot u_{avg}$, . . . , $u_n=(1-\lambda_1-\lambda_2\ldots-\lambda_{n-1})\cdot u_{avg}$, such that $\Sigma_{i=1}^{n-1}\lambda_i=1$ and $0<\lambda_i<1$.

5. The gas compressing system according to claim 2, further comprising a discharge pressure transducer configured to measure the discharge pressure in the common discharge manifold, wherein the process controller is a proportional-integral controller configured to determine the aggregate load demand ($u_{avg}$) based on a difference between an operator set point and the discharge pressure.

6. The gas compressing system according to claim 2, wherein the process controller generates the aggregate load demand signal ($u_{avg}$) according to the following equation: $u_{avg}(t)=K_p e(t)+K_i\int_0^t e(t)dt$, where $K_p$ is a proportional gain parameter, $K_i$ is an integral gain parameter, and e(t) is a difference between the operator set point and the discharge flow rate.

7. The gas compressing system according to claim 2, wherein the adaptive load sharing optimizing controller includes an implied speed computation module configured to determine a first implied speed signal and an $i^{th}$ implied speed signal for $i^{th}$ compressor and $k^{th}$ iteration based on the values of $\lambda_{i,k}$, the aggregate load demand signal ($u_{avg}$) a first discharge pressure measured by a first discharge pressure transducer of the plurality of n discharge pressure transducers, a first suction flow rate through a first suction line measured by a first suction flow transducer in the plurality of n suction flow transducers, an $i^{th}$ discharge pressure measured by an $i^{th}$ pressure transducer in the plurality of n discharge pressure transducers, an $i^{th}$ suction flow rate through an $i^{th}$ suction line measured by an $i^{th}$ suction flow transducer in the plurality of n suction flow transducers, and an operator set point.

8. The gas compressing system according to claim 7, wherein first and $i^{th}$ implied speed signals, i=1 . . . n, are determined by solving nonlinear algebraic equations of pressure ratios $P_1=f_1(q_1,u_1)$, $P_2=f_2(q_2,u_2)$, . . . , $P_n=f_n(q_n,u_n)$, for $q_1, q_2, \ldots, q_n$ using stored performance characteristics of each compressor in the plurality of n compressors, where $q_1, q_2, \ldots, q_n$ are the first through $n^{th}$ suction flow rates.

9. The gas compressing system according to claim 7, wherein the adaptive load sharing optimizing controller includes a consumed energy computation module configured to determine an energy required by each compressor in the plurality of n compressors based upon a value of $\lambda_{i,k}$ in the $k^{th}$ iteration, a first implied speed signal of the $k^{th}$ iteration and an $i^{th}$ implied speed signal of the $k^{th}$ iteration, the first discharge pressure, the first suction flow rate, the $i^{th}$ discharge pressure, the $i^{th}$ suction flow rate, i=1 . . . n, and the operator set point.

10. The gas compressing system according to claim 9, wherein a total efficiency Q is calculated using pre-computed $i^{th}$ compressor efficiency curves $g_i$, i=1 . . . n, where $Q_1=g_1(q_1,u_1)$, $Q_2=g_2(q_2,u_2)$, . . . , $Q_n=g_n(q_n,u_n)$.

11. The gas compressing system according to claim 10, wherein an implied speed computation module computes the implied speed signal for each compressor from $k^{th}$ iteration of λ denoted as $λ_{i,k}$ and supplies the implied speed signal to the consumed energy computation module, which computes the energy required for each compressor for a given implied speed, wherein consumed energy computation module determines if the consumed energy at $k^{th}$ iteration of λ, denoted as $λ_{i,k}$, is decreased compared to the previous iteration, a new $k+1^{th}$ iteration $λ_{i,k}+1$ is calculated by the module for λ iteration in accordance with the consumed energy at the $k^{th}$ iteration, a new $k+1^{th}$ iteration $λ_{i,k+1}$ is done in accordance with the used optimization algorithm if a decrease for consumed energy at the $k^{th}$ iteration of λ is obtained in the computation compared to the $k-1^{th}$ iteration and no further iterations of λ are calculated by the module for λ iteration in accordance with the consumed energy at the $k^{th}$ not decreasing compared to the $k-1^{th}$ iteration.

12. The gas compressing system according to claim 11, wherein the module for λ iteration stops calculating iterations of λ in accordance with exceeding a time threshold for calculating an iteration of λ.

13. A method of controlling a gas compressing system having a plurality of n compressors connected in a parallel pneumatic circuit, each compressor in the plurality of n compressors each having a suction line in pneumatic communication with a common suction manifold configured to receive a gas stream from an upstream source and each having a discharge line in pneumatic communication with a common discharge manifold configured to deliver compressed gas to a downstream load, a plurality of n suction flow transducers configured to measure a suction line flow rate of gas flowing through each suction line into the plurality of n compressors, a plurality of n suction pressure transducers configured to measure a suction line pressure of the gas flowing through each suction line, a plurality of n discharge pressure transducers configured to measure a discharge line pressure of gas flowing through each discharge line from the plurality of n compressors, and a discharge flow transducer configured to measure a discharge line flow rate of gas flowing through the common discharge manifold, the method comprising:
   computing an aggregate load demand based upon at least one parameter selected from a list consisting of a discharge pressure in the common discharge manifold and a discharge flow rate through the common discharge manifold, and an operator set point;
   computing n−1 load split parameters λi based upon said aggregate load demand, suction line pressure, suction flow rate, and discharge line pressure of each compressor;
   computing speed demand for each of n compressors based upon said load split parameters λi and aggregate load demand; and
   controlling a speed of the plurality of n compressors based upon speed demand for each compressor.

14. The method according to claim 13, wherein the plurality of n compressors includes a first compressor driven by a first variable speed drive system and an $i^{th}$ compressor driven by an $i^{th}$ variable speed drive system, wherein the method further comprises:
   iteratively calculating a compressor load split parameter λ to the value that provides minimum total consumed energy by the compressors for a given value of aggregate load demand;
   calculating a first speed signal ($u_1$) and an $i^{th}$ speed signal ($u_i$), based on the aggregate load demand ($u_{avg}$) and the compressor load split parameter λ; and
   transmitting the first speed signal ($u_1$) and the $i^{th}$ speed signal ($u_i$) to the first variable speed drive system and the $i^{th}$ variable speed drive system respectively, i=1 . . . n.

15. The method according to claim 14, wherein the process controller is a proportional-integral controller, the method further comprising:
   measuring the discharge pressure in the common discharge manifold; and
   determining the aggregate load demand ($u_{avg}$) based on a difference between an operator set point and the discharge pressure.

16. The method according to claim 14, wherein the process controller is a proportional-integral controller, the method further comprising:
   measuring the discharge flow rate through the common discharge manifold; and
   determining the aggregate load demand ($u_{avg}$) based on a difference between an operator set point and the discharge flow rate.

17. The method according to claim 14, further comprising:
   measuring a first discharge pressure in a first discharge line of the first compressor, a first suction flow rate through a first suction line, an $i^{th}$ discharge pressure in an $i^{th}$ discharge line of the $i^{th}$ compressor, and an $i^{th}$ suction flow through an $i^{th}$ suction line; and
   determining a first implied speed signal and an $i^{th}$ implied speed signal for $i^{th}$ compressor and $k^{th}$ iteration from the values of $λ_{i,k}$, the aggregate load demand ($u_{avg}$), the first discharge pressure, the first suction flow rate, the $i^{th}$ discharge pressure, the $i^{th}$ suction flow rate, and the operator set point, wherein the first implied speed signal and the $i^{th}$ speed signal are determined by solving nonlinear algebraic equations of pressure ratios using stored performance characteristics of each compressor in the plurality of n compressors.

18. The method according to claim 14, further comprising:
   determining an energy required each compressor in the plurality of n compressors based upon a current value of $λ_{i,k}$, a current first implied speed signal and a current $i^{th}$ implied speed signal, the current first discharge pressure, the current first suction flow rate, the current $i^{th}$ discharge pressure, the current $i^{th}$ suction flow rate, and the operator set point.

19. The method according to claim 18, further comprising:
   calculating a total efficiency Q of n compressors using pre-computed efficiency curves.

20. The method according to claim 19, further comprising:
   determining if energy consumed at a $k^{th}$ iteration of λ denoted as $λ_{i,k}$ is decreasing compared to the previous iteration;

calculating a new k+1$^{th}$ iteration of λ denoted as $\lambda_{i,k+1}$ in accordance with the energy consumed at the k$^{th}$ iteration if the total efficiency Q is decreasing compared to the k−1$^{th}$ iteration;

not calculating any further iterations of λ in accordance with the consumed energy at the k$^{th}$ iteration if the total efficiency Q is not decreasing compared to the k−1$^{th}$ iteration; and ceasing calculating iterations of λ in accordance with exceeding a time threshold for calculating an iteration of λ.

* * * * *